United States Patent [19]

Kooiman

[11] Patent Number: 4,946,130
[45] Date of Patent: Aug. 7, 1990

[54] FLOW CONTROL DEVICE

[76] Inventor: Peter Kooiman, Box 352, Red Deer, Alberta, Canada, T4N 5E9

[21] Appl. No.: 276,897

[22] Filed: Nov. 25, 1988

[30] Foreign Application Priority Data

Mar. 16, 1988 [CA] Canada .................. 561608

[51] Int. Cl.⁵ .............. F16K 31/00; F16K 35/00; F16K 31/44
[52] U.S. Cl. ........................ 251/95; 70/176; 70/386; 251/100; 251/297; 251/102; 251/110; 303/89
[58] Field of Search .............. 251/95, 100, 101, 102, 251/110, 297; 303/50, 84.2, 89; 70/175, 176, 179, 386; 137/383, 384.2, 384.6, 384.8, 385

[56] References Cited

U.S. PATENT DOCUMENTS

| | | | |
|---|---|---|---|
| 1,463,735 | 7/1923 | Varrieur | 251/100 |
| 1,861,442 | 6/1932 | Hammerstein | 251/297 |
| 2,326,487 | 8/1943 | Overbeke | 251/297 |
| 2,394,487 | 2/1946 | Rotter et al. | 251/297 |
| 2,440,744 | 5/1948 | Grinnell et al. | 70/232 |
| 2,554,306 | 5/1951 | Mack | 280/33.05 |
| 2,636,706 | 10/1953 | Lucas et al. | 70/232 |
| 2,641,124 | 9/1953 | Gallagher et al. | 70/232 |
| 3,002,368 | 10/1961 | Moberg | 70/176 |
| 3,033,016 | 5/1962 | Moberg | 70/176 |
| 3,140,072 | 7/1964 | Sciuto, Jr. | 251/100 |
| 3,165,120 | 1/1965 | Horowitz | 251/297 |
| 3,224,815 | 12/1965 | Horowitz | 251/100 |
| 3,269,159 | 8/1966 | Young | 70/232 |
| 3,477,687 | 11/1969 | Doutt | 251/100 |
| 3,602,245 | 8/1971 | Meisel | 251/297 |
| 3,617,663 | 11/1971 | Whittemore | 200/61.86 |
| 3,664,632 | 5/1972 | Valentine | 251/101 |
| 3,682,195 | 8/1972 | Cvetkovich | 137/384.6 |
| 3,768,333 | 10/1973 | Bidwell | 251/297 |
| 3,802,459 | 4/1974 | Geraudie | 251/74 |
| 3,950,959 | 4/1976 | Coureau | 251/95 |
| 3,998,495 | 12/1976 | Maxwell | 303/89 |
| 4,039,202 | 8/1977 | Barnettler | 280/507 |
| 4,061,158 | 12/1977 | Musial | 251/297 |
| 4,543,984 | 10/1985 | Murray | 137/385 |
| 4,614,097 | 9/1986 | Signorelli | 70/386 |

FOREIGN PATENT DOCUMENTS

| 313653 | 6/1929 | United Kingdom | 251/297 |
|---|---|---|---|
| 2147974 | 5/1985 | United Kingdom | 251/100 |

Primary Examiner—George L. Walton
Attorney, Agent, or Firm—David A. Burge

[57] ABSTRACT

A flow control device for use in a fluid or gas line is disclosed. In one example, the device controls the flow of air to the brakes of a large vehicle such as a semi-trailer truck. The device includes a housing having an inlet port and an outlet port both of which communicate with the interior of the housing and a moveable valve assembly which selectively can close or open the ports with respect to one another. The valve assembly includes means for axially moving the assembly and locking it in open and closed positions. Means are provided for biasing the valve assembly to an open position to prevent accidental closing of the valve which possibly could result in the application of brakes of the vehicle.

2 Claims, 2 Drawing Sheets

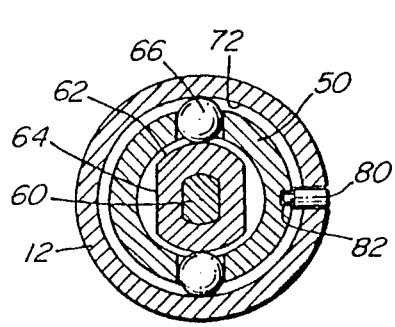
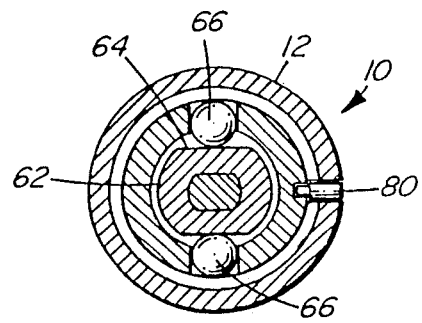
FIG. 3  FIG. 4
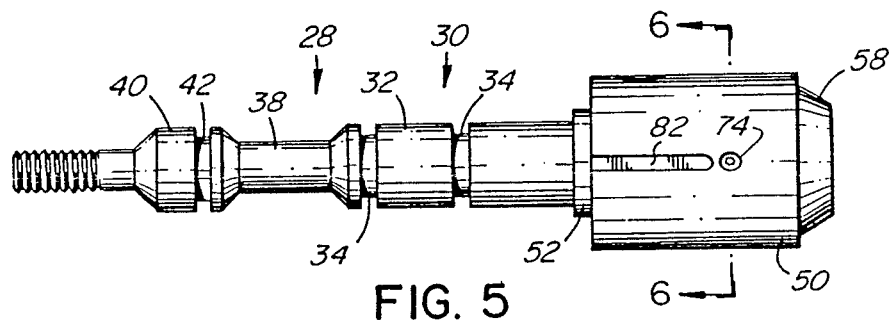
FIG. 5
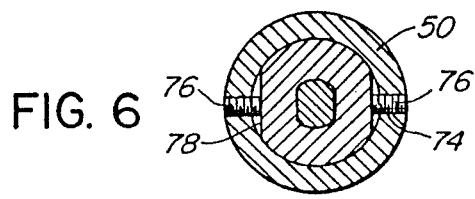
FIG. 6
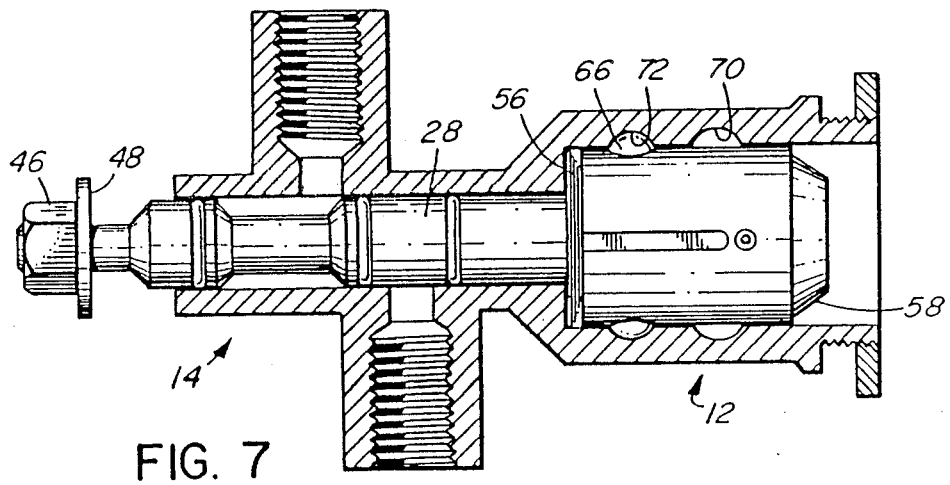
FIG. 7

4,946,130

FLOW CONTROL DEVICE

FIELD OF THE INVENTION

This invention relates to flow control devices for use in fluid or gas line applications and particularly in relation to air-brake systems for vehicles such as semitrailer trucks.

BACKGROUND OF THE INVENTION

Flow control devices which provide brake airline locks and the like for vehicles are well known. However, many of these are expensive to manufacture due to their complicated designs and numbers of parts involved and others, while adequate, are open to improvement in this art.

U.S. Pat. No. 3,682,195 of Aug. 8th, 1972, CVETKOVICH, discloses a wheel lock for a vehicle comprising a valve means that is interposed in the brake fluid line of the vehicle, the lock including a key-locked camshaft. Turning the key lock operates the camshaft which urges the valve means toward a closed position to block fluid flow through the brake line.

U.S. Pat. No. 3,617,663 is another example of the prior art and shows an anti-theft lock for vehicle brakes and ignition systems which uses a key-operated cam to release brakes of the vehicle.

The U.S. Patent to MURRAY, U.S. Pat. No. 4,543,984 of Oct. 1st, 1985, discloses a valve means mounted on a trailer connected with a tractor truck, the valve means being interconnected in the air line to maintain brake-on air pressure in the line while the trailer is parked. The valve means has a locking handle to inhibit trailer theft.

The Patent MAXWELL, et al U.S. Pat. No. 3,998,495 of Dec. 21st, 1976, illustrates a control valve which selectively can establish a connection between a spring applied parking brake in an air-brake vehicle and either the parking brake air reservoir or the exhaust port of the control valve. The control valve incorporates a lock that enables an operator to secure the valve in the position in which the parking brakes are applied.

The present invention provides novel and unobvious differences over the prior art such as U.S. Pat. No. 3,998,495. The locking mechanism shown in the drawings is an *ACE or tubular type cylinder to control the position of a cam which acts upon locking means in the unit. However, it will be appreciated that the device can be fitted with any one of a variety of high security type cam lock cylinder such as *Medico, *Abley or the like. In a locked position, the cam forces the locking means into operative positions in the device. In the prior art such as U.S. Pat. No. 3,998,495, the patentee uses a Wafer-type cylinder which controls the position of a bolt that secures the valve in the open or closed positions.
*TRADEMARK The present invention incorporates means to ensure that in the event that an operator leaves his key in the lock and in the "unlocked" position, the valve means will return and stays in an "open" position. This will prevent accidental closing of the valve which could result in the application of the vehicle brakes. This is a definite safety feature of the present invention over the prior art.

Moreover, the elements in the present invention are so designed that the device will not bleed off downstream pressure in an air-brake system when the valve means is moved to a "closed" position. To lock the brakes on in a vehicle an operator would look the valve in a closed position and then set his emergency brakes by closing the emergency brake valve already incorporated in the truck brake circuitry. The emergency brake valve bleeds off downstream pressure. This emergency brake valve is a required component in most air-brake systems.

With the present arrangement, a locking of the emergency brakes would be a deliberate, two-step procedure which again increases the safety of the system.

Prior designs such as U.S. Pat. No. 3,998,495 include an exhaust port to bleed off downstream pressure when the valve is closed thereby duplicating the purpose of the existing emergency brake valve.

The present invention goes a long way to prevent accidental application of the brakes due to the inability of the flow control device according to the invention to bleed off downstream pressure and also due to the provision of the means that biases the valve means to the operative or open position.

SUMMARY OF THE INVENTION

The control device of the present invention incorporates a valve of a spool-type configuration that axially moves in a lock housing. The valve is opened or closed depending upon the position of the spool in relation to inlet or outlet ports in the housing.

One end of the spool incorporates a lock cylinder and cam assembly of the type commonly known as a "cam lock". A lock cylinder controls the rotation of the cam which acts upon at least one and preferably a pair of locking members such as steel balls. When the lock cylinder is in a locked position, the cam forces the ball to extend outwardly of the outside surface of the spool into one of a pair of grooves or detents machined into the inner wall of the valve body. When the balls are moved radially by the cam into the grooves they prevent axial movement of the valve spool.

By rotating the lock cylinder by use of a key to the unlocked position, the cam is rotated so that a smaller diameter is presented to the steel balls allowing them to move radially inwardly into the valve assembly to such an extent that they no longer project from the surface of the spool. In so doing, the valve spool is free to be moved axially in or out of the body by the operator by pulling or pushing on a control key. Axial movement of the spool is limited at either end of the unit.

The arrangement also features a compression spring which acts upon the valve spool so that it biases the spool to move to the open position when the key cylinder is rotated to the unlocked position, thereby allowing a free flow of compressed gases or fluids through the ports. To block the flow of these compressed gases or fluids through the ports the operator must, by use of the proper key, rotate the lock cylinder to the unlocked position, push the spool in against the spring pressure as far as it will go and turn the key back to the locked position thereby locking the spool in the valve body in such a position as to prevent or block the flow of compressed gases or fluids through the ports.

According to a broad aspect, the invention relates to a flow control device for use in a fluid or gas line comprising, a housing having an inlet port and an outlet port each in communication with the interior of the housing to provide fluid or gaseous flow therethrough; valve means in the housing and being axially moveable between an operative position in which the ports are opened by the valve means and an inoperative position in which at least one of the ports is closed by the valve means; means in the housing and connected to the valve means for locking the valve means in the operative and inoperative positions and for effecting movement of the valve means between the positions; and means biasing the valve means to the operative position.

BRIEF DESCRIPTION OF THE DRAWINGS

The invention is illustrated by way of example in the accompanying drawings in which:

FIGS. 3 and 4 are sectional views taken along the line 3—3 of FIG. 2 and illustrate portions of the assembly in locked and unlocked positions;

FIG. 5 is an elevation view of the valve assembly;

FIG. 6 is a sectional view taken along the line 6—6 of FIG. 5; and

FIG. 7 is a cross-sectional view of the assembly similar to FIG. 2 but showing the valve assembly in a closed position.

Referring to FIGS. 1 and 2, the flow control device according to the invention comprises a housing generally illustrated at 10 the body of which is preferably manufactured of a cast metal such as bronze, zinc-aluminum alloy or any other suitable material.

Figure 1:
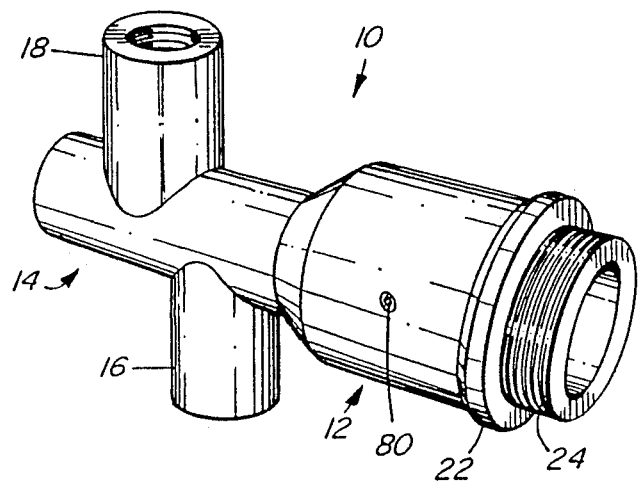
FIG. 1 is a perspective view of the housing device of the device according to the invention.

The housing 10 consists of two integrally formed cylindrical portions, one of which forms an operative end at 12 and the other portion of much smaller diameter forming the control portion or control end 14.

The control end 14 includes an inlet port 16 and an outlet port 18, both of which are in communication with the interior 20 (FIG. 2) of the control end of the housing to provide fluid or gaseous flow through the device.

The operative end 12 is provided with a flange 22 or equivalent means which, together with an adjacent threaded portion 24 and nut 26, provide the means for mounting the housing 10 in a panel such as by locking the body of the housing 10 in an aperture of suitable size cut into a dashboard of a tractor-trailer truck.

The control end of the housing 10, specifically the inlet and outlet ports 18 are connected into a fluid or gas line such as an air-brake line in a truck.

Figure 2:
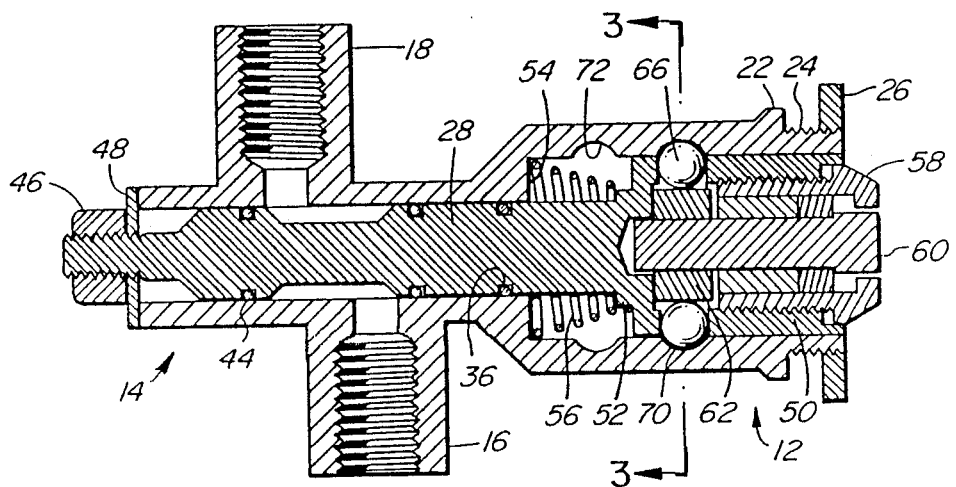
FIG. 2 is a cross-sectional view of the device shown in FIG. 1.

A valve assembly 28 is shown in elevation in FIG. 5 and in cross-section in FIG. 2.

The valve assembly 28 comprises 2 main sections, a valve means 30 sized to operate within the control end 14 of the device and a locking means at the other end and sized to be slidably received in the operative end 12 of the housing.

As seen in FIGS. 2 and 5, valve means 30 includes a piston valve 32 flanked by a pair of grooves 34 for receiving 'O' rings 36, FIG. 2. A spool portion 38 of reduced diameter allows flow of fluid or gaseous matter from one port, through the interior of the unit and out the other port as illustrated in FIG. 2.

A second piston 40 is provided with a groove 42 and an 'O' ring 44 for sealing off the end of the control portion 14. The terminal end of the assembly is threaded to receive a stop nut 46 and washer 48 which provides a limit to the movement of the assembly 28 towards the operative end 12 of the unit. Nut 46 is of the self-locking type and its position on the terminal end of assembly 28 is adjusted during assembly of the unit so that the assembly 28 stops in the proper position.

The operative end 12 of the housing 10 is of greater diameter than the control end so as to accommodate the enlarged, cylindrical portion 50 of the assembly. This portion includes a peripheral shoulder 52 adjacent the portion of reduced diameter of the assembly and shoulder 52 acts as a limiting stop by engaging the end wall 54 of the enlarged cylindrical portion 12 of the unit when the assembly 28 is moved to its closing position as shown in FIG. 7.

Spring means 56 between the end wall 54 and the stop 52 on the assembly 28 serve to bias the assembly 28 towards the operative end of the unit and towards its operative position.

Referring now to FIGS. 2, 3, 4 and 6, the enlarged portion 50 of the assembly is machined to receive a lock cylinder illustrated generally at 58. Portion 50 of the valve assembly has a threaded interior wall which accepts the threaded outer surface of the lock cylinder which is a type commonly known as a tubular or "ACE" cam lock, but, is not restricted to this type of cylinder as mentioned above.

A lock cylinder shaft 60 is mounted inside the lock cylinder 58 and includes a cam 62 at the inner end thereof which includes a pair of diametrically opposed flats 64. The peripheral surface of cam 62 including the flats 64 engage a pair of locking balls 66 located in apertures 68 provided in the cylindrical wall of the enlarged portion 50 of the valve assembly. As shown in FIGS. 2, 3 and 4, the operative end 12 of the housing includes in its inner wall two pairs of axially spaced grooves 70, 72 for receiving the locking balls therein.

It will be evident from FIG. 2 that with the valve assembly in the open or operative position, the spool portion 38 of the assembly, together with the open inlet and outlet port 16 and 18, provides an uninhibited passage through the device for fluid or gaseous medium. The valve assembly 28 is secured in this position by the balls 66 being engaged in the grooves 70, the balls being maintained in that position by the cam surfaces 62, preventing axial movement from that position of the valve assembly 28. See also FIG. 3

In order to close the inlet port 16 and interrupt the circuitry of the fluid or gaseous medium, an operator rotates the cylinder shaft 60 and the cam 62 ninety degrees so that the flats 64 of the cam is presented to the ball 66 allowing them to move radially inwardly towards the shaft center line and unlocking the assembly 28 from its FIG. 2 position. The operator then pushes inward on the lock cylinder shaft 60 until the assembly reaches its FIG. 7 position with the stop 52 engaging the wall 54 and, with another quarter turn of the lock cylinder shaft 60, the ball 62 enter the grooves 72 locking the assembly 28 in the closed position.

Referring to FIG. 6, the enlarged portion 50 of the assembly has diametrically opposed threaded apertures 74 for receiving set screws 76 (FIG. 6) which engage the lock cylinder to prevent it turning inside the assembly 28. After the lock cylinder 60 and the cam 62 on the end thereof are screwed into the enlarged portion 50, the set screws are threaded inwardly to bear upon opposing flats 78 of the lock cylinder and thereby preventing it from unscrewing out of the assembly portion 50.

Referring to FIGS. 1, 3 and 4, a guidepin 80 is located in the outer wall of the operative end 12 of the housing 10, the inner end of the pin being located in an elongated groove 82 (FIG. 5) on the outer wall of the enlarged portion 50. The elongation of the groove allows the valve assembly 28 to move axially in the housing but prevents the assembly 28 from turning when the operator turns the key in the lock cylinder. Obviously, the cylinder must be held stationary during this operation so that only the cylinder shaft, cam 62 and ball 66 make an initial movement before the balls are released from the grooves 70 allowing inward movement of the assembly 28.

While the invention has been described in connection with a specific embodiment thereof and in a specific use, various modifications thereof will occur to those skilled in the art without departing from the spirit and scope of the invention as set forth in the attached claims.

The terms and expressions which have been employed in the specification are used as terms of description and not of limitation and there is no intention in the use of such terms and expressions to exclude any equivalents of the features shown and described or portions thereof, but it is recognized that various modifications are possible within the scope of the invention claim.

The embodiments of the invention in which an exclusive property or privilege is claimed are defined as follows:

1. A flow control device for using in a fluid or gas line, comprising:
   (a) a housing having an operative end and a control end, and defining an interior passage that extends through the housing and communicates with interior portions of the operative end and the control end;
   (b) said housing defining an inlet port and an outlet port in said control end of said housing, with each of said ports being in communication with the passage in interior portions of the control end of said housing to provide fluid or gaseous flow thereamong;
   (c) an operator controlled lockable valve assembly having opposed operative and control end regions thereof, and being movably carried within the passage of said housing for movement relative to the housing between an operative position and an inoperative position, with valve means at the control end region thereof and being located in said control end portion of said passage, and with locking means at the operative end region thereof and being located in said operative end portion of said passage;
   (d) said valve means of said assembly including a spool portion of reduced diameter and piston valve means on either side thereof;
   (e) said locking means including:
      (i) a key actuated lock cylinder and shaft concentrically located in said operative end region of said assembly;
      (ii) rotatable cam means on said shaft; and,
      (iii) at least one movable locking member actuated by said cam means;
   (f) locking member receiving means in said housing for receiving said locking member:
      (i) for selectively retaining said assembly in said operative position to thereby establish communication among said ports and said passage to provide fluid or gaseous flow between said inlet port and said outlet port; and,
      (ii) for selectively retaining said valve assembly in said inoperative position to thereby cause said piston valve means to close at least one of said inlet and outlet ports to close off communication among said ports and said passage;
   (g) means biasing said valve assembly to said operative position;
   (h) said housing including a first stop means and said valve means including a second stop means;
   (i) said cam means being initially rotatable to free only said movable locking member in either the open or closed positions for effective movement and alignment of said locking member with said locking member receiving means; and,
   (j) said first and second stop means engaging one another for movement and alignment of said movable locking member with said locking member receiving means when said valve means is moved to a closed position.

2. A flow control device according to claim 1 in which said at least one moveable locking member includes a pair of balls located within the operative end of said passage and being free for radial movement therein, said cam means being secured to said shaft radially inwardly of said balls for effecting movement of said balls in a radial direction, said locking member receiving means including axially spaced pairs of diametrically opposed recesses in the wall of said housing for retaining said balls therein to prevent axial movement of said assembly.

* * * * *